United States Patent [19]

Rosenthal et al.

[11] Patent Number: 4,878,524
[45] Date of Patent: Nov. 7, 1989

[54] WOODWORKING MACHINE HAVING A PLURALITY OF SEQUENTIALLY OPERATIVE MULTIPLE TOOL UNITS

[75] Inventors: Bruce C. Rosenthal; Kevin L. Zill, both of Sheboygan; Kevin R. Claerbaut, Oostburg; David M. Berglund; Kenneth L. Grover, both of Plymouth, all of Wis.

[73] Assignee: Kohler General Corp., Sheboygan Falls, Wis.

[21] Appl. No.: 206,268

[22] Filed: Jun. 13, 1988

[51] Int. Cl.⁴ .......................... B27B 1/00; B27M 3/00
[52] U.S. Cl. .................................... 144/356; 29/33 P; 144/3 R; 144/363; 144/134 R; 409/158; 409/191; 409/79
[58] Field of Search ................. 409/79, 158, 191, 228, 409/229, 213, 217; 29/33 P, 33 Q; 144/1 R, 2 R, 3 R, 1 B, 356, 357, 367, 368, 369, 374, 363, 134 R

[56] References Cited

U.S. PATENT DOCUMENTS

| | | | |
|---|---|---|---|
| 2,577,766 | 12/1951 | Johnson et al. | 409/158 |
| 3,029,710 | 4/1962 | Fotsch et al. | 409/158 |
| 3,289,714 | 12/1966 | Hammer | 144/117 R |
| 4,471,822 | 9/1984 | Griganavicius | 144/3 R |

Primary Examiner—W. Donald Bray
Attorney, Agent, or Firm—Andrus, Sceales, Starke & Sawall

[57] ABSTRACT

A woodworking machine has a series of stations spaced along a conveyor having a clamp support for holding flat wood parts and passing the edges through the stations which include cope stations as well as others. The coping stations have a tool unit with a stack of tools mounted on a common spindle. The tools in each stack at the several stations are interrelated such that the cuts of the individual tools can be combined to form different final profiles in a wood part moving through the several stations. The particular cuts in the profile line are analyzed and interrelated to define basic cuts which can be combined to form the final profiles. One tool of each tool stack provides a particular cut, and by precise positioning of the individual tools, the combination of sequential cuts provide the final profile. Each tool may form a complete cut, may overlap a previous cut to form a continuation of such previous cut or may form a cut which includes only a portion of its cutting face. Computer aided design technology may be used. The machine significantly reduces the tooling costs by significantly reducing the number of tools and the complexity of the tools required for producing a product profile line. Each tool includes a support on the spindle with a cutting tip, many of which are basic presently used tips having flat edges and the like. The tool position control includes an absolute positioning system including a computer in closed loop control program. The control unit establishes precise orientation to form a continuous profile from different tools.

17 Claims, 3 Drawing Sheets

WOODWORKING MACHINE HAVING A PLURALITY OF SEQUENTIALLY OPERATIVE MULTIPLE TOOL UNITS

BACKGROUND OF THE PRESENT INVENTION

This application relates to a woodworking apparatus and particularly to a multiple station woodworking apparatus including sequential tool stations each having a stack of tools for forming a plurality of surface configurations.

In automated woodworking machines for forming and shaping the coutour and configuration of a wood member, a substantial plurality of individual woodworking tools are mounted in predetermined positioning in spaced relation along a work conveying unit. Each of the many tools is accurately positioned for working on the wood member as it passes the tool. The work is carried by an appropriate transport or conveyor unit sequentially past the tools. In various applications using the individual tools spaced along the work path, in excess of 50 different tool axii at the work stations may be necessary for properly locating the individual tools and thereby creating defined shaping and forming of the various surfaces and edges of the wood product during a single cycle through the machine. Various tools are inventoried and mounted at each station in order to produce various profiles. Thus, cabinetry panels, doors, windows and the like are typical elements which are processed through relatively high speed woodworking and shaping machines. A particularly satisfactory position control system for positioning of tools in woodworking apparatus is disclosed in woodworking apparatus is shown in the copending application of Bruce Rosenthal entitled "Multiple Head Woodworking Apparatus With Automated Head Positioning Apparatus" and assigned to the same assignee as this application and invention.

The woodworking apparatus of the prior are in addition to using individual tools at longitudinal spaced locations has suggested mounting a plurality or stack of complete profile tools on a single spindle at one station. A position setting unit position one of the tools into operative alignment for working of the edge face of a work member or part. Each tool is this constructed in accordance with conventional practice to form a one complete profile cut which particularly is related to and forms the total profile configuration, and a separate profile tool is designed for each particular profile cut. For each given line of part profiles, the individual tools are mounted to the machine in appropriate relation and through a position control establish the necessary cut in the wood member. The machine is set up with different tools to change the profiles and a run of those profiles is made.

As a practical matter to set up the machine for a line production, the manufacturer has thus historically used the plurality of individual profile tools to permit the tooling for the different profiles. The sequential stations are set up with the plurality of individual tools on different axis to form a profile or the stack of complete profile tools are mounted in a tool stack. The system of stacked tools minimizes the down time required for tool change but the total number of tools required is increased which may create a significant increase in tool costs.

With present day technology, manufacturers either use the single tool stations with the necessary frequent tool changes, or the series of stacked tools with a large number of different complete tools for completing a particular profile. A manufacturer, for example, which required 53 different profiles need 35 tools on a series of machine stations in order to minimize or avoid tool changes.

A tool at any given station in a conventional stacked system may cost anywhere from $1,000.00 to $2,000.00 per set. To provide complete tooling for a conventional stacked machine may require tooling cost in the neighborhood of $70,000.00 to $100,000.00.

In the mass production of a line of standard work products, a great inventory of tools is often required. In addition, each particular product requires retooling of the machine. The retooling with the necessary accurate positioning is both time consuming and costly. Further, the retooling which requires human intervention is accompanied with the possibility of human error in the initial set up of the machine.

SUMMARY OF THE PRESENT INVENTION

The present invention is particularly directed to a woodworking apparatus with a series of stations, each station having tool stacks or groups including having a plurality of basic interrelated tools. Each tool stack has the tooling interrelated such that the cuts of the individual tools can be combined to form different final cuts and shapes in the wood product to produce a particular profile. Many of the profiles in a line of profiles to be formed by a given woodworking machine have portions which are identical or similar to portions of other profiles. The individual tools in each stack are interrelated with the line of profiles so as to form a series of similar but distinctly different profiled products. In analyzing a total product line, the particular cuts in each product are analyzed and interrelated to each other to define a plurality of basic cuts to form each final profile and which individually may form a portion of a profile and in combination with another tool cut complete the profile, required for forming of product. The particular tools required may be reduced to a number of basic and simple cutting tools in combination with a relatively small number of special tools for a given line of profiles. In accordance with the present invention, one tool of a stack of tools at each multitool station provides a particular cut. However, with very precise positioning of the individual tools, the combination of sequential cuts provide a final cut essentially corresponding to a single profile tool unit of the prior art. Although any means can of course be provided to relate and correlate the tools and the multiple profiles of the products including visual analysis, computer aided design provides the technology for cost effective analysis and selection of a plurality of tools for a given multiplicity or line of product.

The tool and product profile interrelation provided by the present invention significantly reduces the tooling costs by significantly reducing the number of tools and the complexity of the tools required for producing a product line. Generally, after a machine has been setup, including the machine control, the machine tooling should not require any change. If a further profile change is added, a particular tool may be added to one of the stacks. However, if the line is dropped or changed significantly, the tools in the existing stacks can be used with convenient and rapid interchange in the machine.

In this aspect of the invention, a profile design uses a plurality of tools where a profile surface might be generated by using similar tools in spaced stations. Further, by using a greater number of tool units per stack of tools to create consecutive cuts to generate a profile, a lesser number of stations may be required. Generally, selected complex cutting tips may be required; and repeated at more than one station. Thus, whereas a five station machine could use a plurality of tool stacks of various partial profile tools, it may be desirable to form a three station unit with a greater number of tools at each station including some tools with more complex shapes. Even where a substantial number of tools are required, in the preferred construction, the system minimizes the necessity of special formed tools. In any event, however, the present invention through the conjoint and interrelated multiple tools and multiple profiles reduces the overall tooling costs while maintaining high quality product production.

The present invention in a practical construction includes a stacked tool unit including a tool support member secured to a spindle. The cutting tools are secured to the periphery of the spindle member. In accordance with this aspect of the present invention, many tools include standard mass produced tool tips releasably affixed to spindle members.

In designing a tool line, the individual tools are combined into a predetermined stack depending upon the product line to be run. As the various tools generally have basic cuts, the tools can be rearranged if a profile line is changed with minimum requirements of new tools. Further, commercially available cutting tips are manufactured with various basic cutting edges including flat and inclined edges of various depths as well as certain curved configurations. The present invention can use such basic tools in combinations to form a substantial portion of differing profiles. The number of tools, and the cost of the individual tools using standard available cutting profiles, therefore significantly reduces the cost and the mounting of the tools in the stacked arrangement can be accurately established. Although long life working tools are available and tool changes should not be required, if necessary, the machine operator having normal skill level can make such changes or maintenance.

More particularly, the several tools and their interrelationship with different profiles are identified. The different tools are then mounted as the plurality of individually tool stacks in the series of tool stations. The tools are aligned in selective position with the work path to present the tools in sequence for progressive forming of a corresponding profile. The different tools at the stations operate conjointly to effect the designed profile. Each tool may form a complete cut, may overlap a previous cut to form a continuation of such previous cut or may form a cut which includes only a portion of its cutting face. For example, in the previous installation where 53 different profiles were identified, the tooling was designed in accordance with the present invention with 6 basic tools per side mounted in stacks of three tools at two successive stations per side. By proper sequential aligning of the tools at each station in the work path, the two stations per side provided completely commercially acceptable cutting of the 53 profiles.

The present invention thus requires positioning of the stack of tools for selective alignment of an individual tool with the work path of the product and particularly the edge portion of part moving through the work path. The tool position must precisely locate the tools to accurately form a profile continuation. An absolute positioning system provides precise positioning of each individual tool, such, for example, as more fully disclosed in the previously identified copending application of Bruce C. Rosenthal. The positive or absolute position control established precise alignment of the working tool with the product member. The ability to establish and maintain precise orientation permits the forming of a continuous profile area with a plurality of different tools. A tool at a first station will form a first cut of a profile, which may require a continuation from that cut in a particular pattern, either equal to or differing from that provided by the first cut. By precise alignment of a second tool at the downstream station with the previously cut profile, a second cut is created as an extension of the first cut. The second tool may be positioned to use only a portion of its cutter edge or the total cutting edge. The two separate cuts, however, appear as a single cut as a result of the precise orientation and placement of the tools. The coordination of the tools to form the various cuts, in combination with the actual precise positioning of the tools, results in the ability to establish a plurality of basic profiles with a relatively few number of tools. The stacked tool unit essentially eliminates the necessity of tool changes in a machine specially constructed for developing and forming a line of profiles.

Generally, in accordance with a practical implementation of the present invention, the woodworking apparatus is constructed in accordance with known technology to include a conveyor for continuously moving of the work parts or product in succession through a plurality of work stations without interruption. The work station which include a tool stack consists of a center spindle and a plurality of rotatable cutting tools mounted in axially spaced. relation on the spindle. The spindle is coupled to a drive motor to rotate the spindle and the tools secured thereon. The tool spindle support is mounted for at least vertical orientation axis and a horizontal orientation axis for location of one tool in the work path of the product flow. One of the tools may be used as a zero reference. Generally, in a practical application, the lowermost tool in the stack may be used as a zero position reference. A motor, preferably a permanemt magnet motor, is connected directly to each spindle support member for each axis and moves the support along the axis. A computer based controller is programmed to control the position of each axis and thereby the position of the stack and therefore, any one tool of the stack of tools with respect to the work path. A linear electronic scale unit provides an absolute position signal as well as a digital readout of the position. This scale can readily provide position accuracy within plus and minus 0.001 inches. The output of the electronic scale is connected to a controller to provide a controlled energization of the positioning axis motor for accurate positioning of the tool. The electronic scale provides a very precise readout of the actual position independant of the characteristic and tolerances within the support drive mechanism. By appropriately mounting of the product to the feed conveyor, the sequenced tool units accurately reproduces any desired part of a profile, or portion of a profile with the balance of the profile completed by subsequent tools. The particular tools provided at any given station will vary depending upon the particular line of profiles to be made. However, the total number of tools required at the sequenced stations for forming a plurality of different profiles is significantly less than the tools required with conventional woodworking profile machines.

The computer based controller is established with a conventional computer capability and in a preferred embodiment. Each tool is identified with the total specification for the tool cut produced by such tool. The computer also includes a menu driven program generator which can receive the specification of a profile and request for assembly of executable program for such profile. If the stored tools can produce the profile, the program generator can create the profile program for corresponding machine control.

The present invention with precise tool positioning produces different interrelated cuts in which adjacent cuts form a specific profile, which would normally be cut at a single cutting. Tolerances are well within woodworking standards and the final product equals products made with prior technology, and the invention is a significant advance in the commercial production of a product line having a different but related profile.

BRIEF DESCRIPTION OF DRAWINGS

The drawings furnished herewith generally illustrate the best mode presently contemplated for the invention and are described hereinafter.

In the drawings.

DESCRIPTION OF ILLUSTRATED EMBODIMENT

Figure 1:
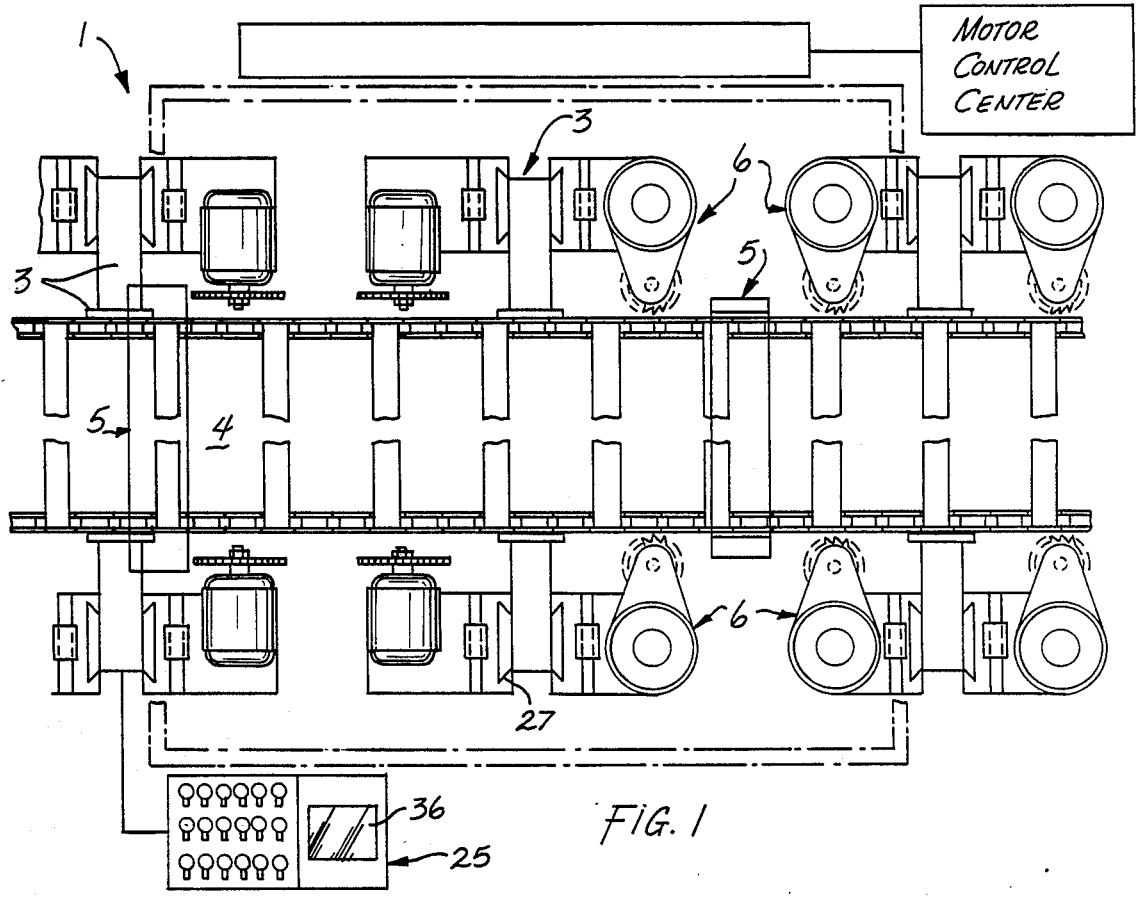
FIG. 1 is a plan elevational view of a woodworking apparatus having multiple stack tool units incorporating the teaching of the present invention.
Figure 2:
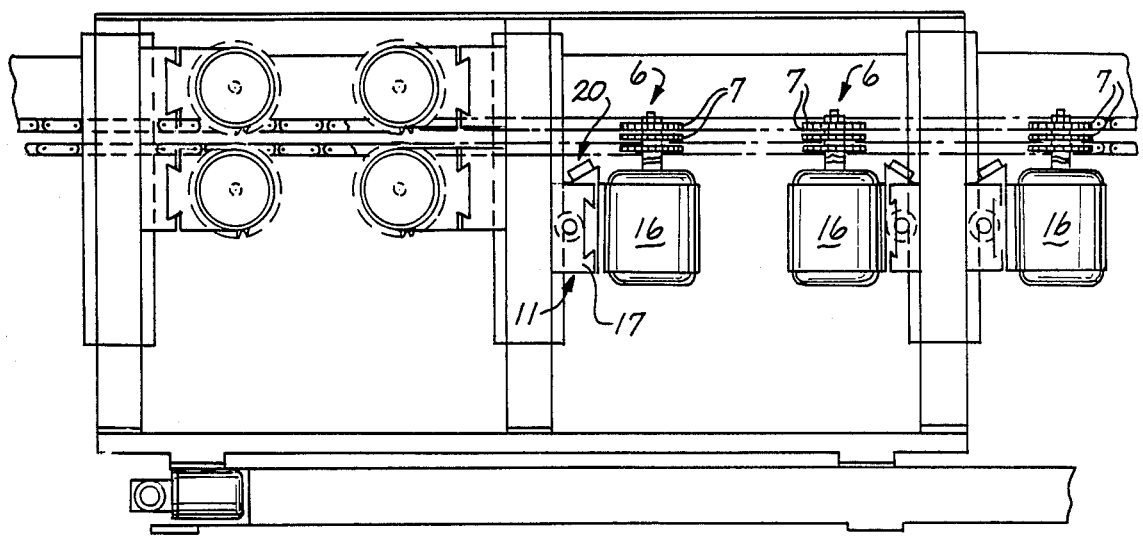
FIG. 2 is a side view of FIG. 1.
Figure 3:
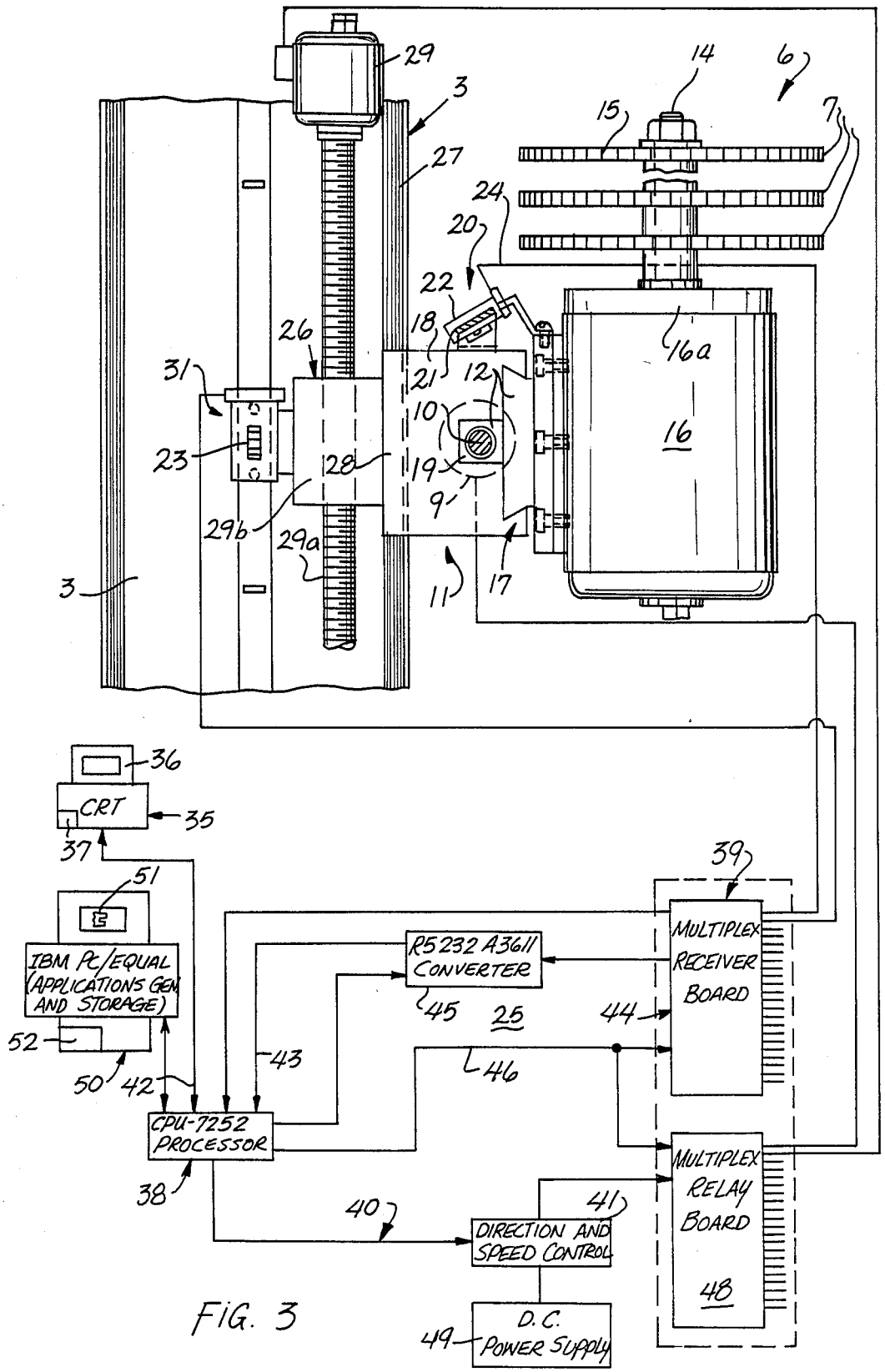
FIG. 3 is an enlarged view of a single stack of tools such as illustrated in FIGS. 1 and 2.

Referring to the drawing and particularly to FIG. 1, a multiple tool woodworking machine 1 constructed in accordance with the teaching of the present invention is shown including a plurality of working and shaping stations 2. The machine 1 includes an elongated support frame 3 with the stations 2 located in longitudinally spaced relation along the frame 3. A conveyor 4 extends throughout the length of the frame 3 and transports successive work parts or members 5 in sequence through the several stations 2 and past working tool units 6 provided at each station 2. In a typical woodworking machine, the sequential tool units 6 may require tool movements on interrelated axii. One or more trim and tenon stations are provided at the incoming end of the machines and include a tool saw or the like to form the outer edge of the part such as a straight flat edge surface in the part. The profile is then formed in the flat edge surface in the following cope stations. Each tool unit 6 in the cope stations includes a plurality of rotary tools 7 mounted in stacked relationship and having cutting tips 8 for profiling a portion of the part edge. The tool units 6 are movable along a vertical axis to align one of the tools 7 with the part and a horizontal axis to align the tool for the proper cut into the part. The tool unit 6 is constructed and mounted for accurate positioning of the tool units 6 and particularly one of the tools 7 relative to the work part 5 for profiling as the latter moves past the tool to form an edge profiled product. Each axis is similarly driven, and referring to the horizontal axis includes a separate drive motor 9 for separately moving the tool unit laterally relative to the work conveyor 4 and the desired position for shaping the wood part 5. Referring to FIG. 3, a conventional drive includes a motor-driven screw 10 secured to a tool position support structure 11, shown as compound slide unit, and a cutting head slide member 12 fixed to the tool unit 6 for linear positioning of the attached tool unit.

For purposes of description, a single tool unit 6 is particularly shown and described for purposes of simplicity and clarity of explanation. Referring particularly to FIG. 3, a single station tool unit is shown illustrating the mounting of a tool stack unit to the machine frame in accordance with the teaching of the present invention. The present invention is particularly directed to the tool units 6 and the other components of the illustrated embodiment are described as required to fully illustrate and describe the illustrated embodiment of the invention.

The positioning support structure 11 supports the tool units on the machine frame 3 for positioning the spindle and therefore tools 7 relative to the work path of parts 3. Generally, each tool unit 6 includes the individual tools 7 formed as a stack of aligned tools on a common rotative spindle 14 secured to the support structure 11.

The individual tools 7 are secured in axially spaced relation to the spindle 14. Each tool is similarly constructed and each tool 7 includes a mounting disc 15 suitably secured to the spindle 14. A keyed construction is shown at 15a in FIG. 4 but any other clamping or securement to the spindle to rotate therewith may be used. The outer edge of the tool disc 15 is recessed to receive the cutting tip 8 which is rigidly affixed to the disc and forms an integrated tool 7 which rotates with the rotation of the spindle 14. The cutting tips 8 of the several tools 7 at any given station have the cutting edge formed with different configurations for forming a predetermined recess or notch corresponding to a recess or notch in the profile, or at least forming a part of the final profile notch or recess.

The spindle 14 is connected to a drive motor 16 directly or through a coupling such as a belt drive unit 16a for rotating the stack of tools.

The compound slide unit includes a first slide unit 17 forming a part of the tool support structure 11 secured to the motor and supports the unit 6 for horizontal movement. The slide unit 17 includes the slide member 12 secured to the motor 16 and which is slidably mounted in a relatively fixed member 18 of the structure 11 for movement along the given horizontal coordinate axis with respect to the movement of the part 5 through the work path of the machine. The slide unit 17 thus provides movement on the axis extended laterally of the work path and thus provides for control of the depth of the cut to be made by the rotating tool.

Positioning motor 9 is coupled to rotate a screw 10 mounted to the member 18. A follower 19 on the screw 10 secured to the slide member 12. Rotation of the screw 10 by motor 9 moves the follower 19 and attached tool unit 6 laterally of the work path. The motor 9 may be manually positioned or automatically positioned under a suitable logic control unit. For manual positioning, the shaft of motor 2 may project from the back of the motor and have a cross-section for receiving a suitable wrench or other tool for manual positioning of the tool unit.

An absolute position sensing unit 20 is coupled to the slide unit 17 to provide an absolute position indication of the tool unit 6 and particularly the several tools 7 with respect to the work path. The illustrated absolute position sensing unit 20 corresponds to that more fully discosed in the previously described co-pending appliation and includes an capacitive rail member 21 mounted to the slide member 18. An electronic head 22 is coupled to the rail member 21 and secured to the relatively movable member 12 of slide unit 17. The head 22 is an electronic reading unit which provides an absolute output reading on a digital display 23 with respect to the position of the head on the rail. The head also provides an absolute position signal at an output cable 24 corresponding to the position of the head relative to the rail. The signal is transmitted to a central controller 25 for programmed positioning of the tool unit 6. The output of the electronic unit, in addition, provides the direct on-site digital readout on a display portion of the head.

In addition, the support structure 11 includes a vertical slide assembly or unit 26 including a fixed slide member 27 secured to the machine frame 3 and a vertically movable slide member 28 slidably mounted thereon and bolted or otherwise interconnected to the relatively fixed lateral slide member 18. A positioning motor 29 is connected to the frame 3 and coupled through a driven screw 29a and a follower 29b secured to slide member 28 for vertical positioning of the tool unit 6. The vertical unit 26 includes an electronic head and rail sensing unit 31 corresponding to unit 20, mounted to the frame 3 and the slide member 28 for providing accurate readout and signalling of the actual vertical position of the tool stack or unit 6 and thus of tools 7.

Each tool unit 6 is similarly constructed and adapted to be positioned laterally into the work path and vertically to selectively orient a particular tool 7 of the tool unit in the path of the part 5. The tool 7, of course, can be located anywhere within the work path such as to form a complete section of the profile, or a partial section forming an extension or modification of a previous cut.

The precise positioning of each tool 7 in the workpath is critical in the present invention in order to produce a high quality product. Where a curved or plain surface is extended by a second cut, the alignment of the second tool with the first cut is of substantial significance. This not only requires accurate positioning of the second tool unit 6 to precisely locate the second tool, but corresponding precise accurate positioning of the first tool unit to ensure that the first cut is in appropriate position for receiving of the next successive cut.

The controller 25 is any suitable logic control unit having a position command input and a position feedback input for generating a drive signal to the positioning motors 9 and 29 to establish a match between the two signals.

The tool unit 6 is assembled and mounted to the machine frame 3 in a known reference relationship to the workpath of parts 5. The sensing units are mounted to produce a reference signal with the spindle 14 in a reference position. One of tools 7 such as the lowermost tool will normally be used as a reference and the several tools 7 programmed into position from such reference.

By using a common vertical reference for each tool unit 6, the system provides automatic global offset compensation. The tool unit 6 can be formed with the tools precisely located. Consequently, appropriate reference location of any one of the tools establishes an appropriate reference for all tools in the stack. The tool unit 6 may be set to a rough reference zero point. The tool unit then retracted a given distance and a predetermined reference cut made.

If some part of a station must be changed, the operator can readily reset the programmed reference for the tool stack. For example, if the scale rail or its support requires replacement or servicing, the mounting relationship with respect to the tool stack may have been changed slightly. The operator can make a profile cut and check the part for accuracy with a suitable micrometer or other appropriate tool. Any variation from the programmed cut can be entered by the operator as an adjustment to the proper offset. The program then establishes the new proper offset for that tool and all other tools in the stack. This difference defines the offset, which is directly automatically introduced into the program for altering of that stack. The operator thus need only introduce the proper program into the controller 25 which will directly set each of the tool units 6 of the several stations 2 with proper tool 7 precisely located to form the programmed profile. Each cut forms a part of the profile and the tools 7 of the successive stations 2 are located to form a continuation of the previous cut.

The control unit 25 and interface circuit is preferably constructed and disclosed in accordance with the previously identified copending application.

Generally, the control unit 25 is microprocessor based control including a control terminal 35, a display unit 36, and keyboard 37 coupled to a central processor or controller 38. The outputs of all the sensing units 20 are multiplexed and converted as at 39 and then transmitted to the central processor 38 which processes the input command signals and the measured signals and generates an output signal at an output line 40 to a motor drive unit 41 for driving the tool positioning motors 9 and 29. The processor 38 includes a fixed operating program for executing a controllable run program for sequentially positioning the tool units 6 and particularly a tool 7 of each unit.

The control unit 25 has an appropriate command input 42 from an operator control terminal 35. The processor or controller 38 has a input 43 connected to receive the absolute position signals from the various sensing units through a multiplexes 44 and an interface converter 45 shown as an RS232 ASCII converter. The processor's fixed operating program sends a transmit signal via a select line 46 to the multiplexer 44 to select the sensing unit and to converter 45 to request a transmission. The signal of the selected sensing unit 20 is then transmitted to the controller 25.

The controller 38, upon operator or programmed command, sequentially and repetitively interrogates each sensing unit 10 for the position signal of the corresponding tool unit in sequence through appropriate repetitive sequencing of the multiplexer.

The select lines 46 multiplexes the output to sequentially activate a motor select relay board 48 for selectively activating the several positioning motors 9 and 29. The motor multiplex board 48 may be a typical relay board connecting individual motor drive lines for the several motors to a common power supply 49 for corresponding controlled energization of the connected motor. The controller 38 activates the relay board 48, and the several relays through the multiplexing select lines 46 in accordance with the corresponding connection of the sensing unit 20 or 31 for that motor.

Although any positioning motor can be used, including conventional service motors, a permanent magnet motor provides a particularly unique and satisfactory motor. The permanent magnet motor merely requires two leads to provide direction control by changing of the wire connections. The polarity is readily controlled by the controller.

For example, in manufacture of windows, a window line may include in excess of fifty different profiles 3. The profiles in a series generally will include certain basic design configurations. The various portions of each profile are thus interrelated as to the form of cut. By providing of the basic tools 7 for portions of each profile, the tools are combined to define the various profiles. The program for each profile is stored for insertion into the controller, as required.

The controller is shown connected to an auxiliary programming computer 50 such as a personal computer with a special applications program generator. The user/operator can produce, manage and store set-up information in a memory of the auxiliary computer 50. The programmed generator presents the profile edge in its display 51 and the operator introduces the shape and dimensions of the profile via its keyboard 52 to define the profile. The profile itself may be graphically presented in a two dimensional display, with the associated dimensions displayed as the user inputs such dimensions, for ease and accuracy of the operator use. The tools 7 of all stations are stored in memory and the computer 50 searches for tools available to form the different parts of the profile and if available tools to complete the profile are located, the necessary profile program is generated. The generated profile program can be down loaded to the controller and can only be stored as a part of the profile programs. The computer 50 processes the inputted information and establishes a file including the tools and critical set-up numbers needed for setting the machine to produce the particular profile. A substantial number of profile files can be created and stored in the peripheral computer. Each profile file has a related identification number which can be down loaded directly into the processor for execution.

In other more complex units, one or more additional tool stations may be required with an appropriate plurality of tools including selected complex tools to produce a particular profile. Generally, as a profile portion becomes more complex, the sequence of tools required to form the profile by a series of cuts would require increasing of the number of stations in a less cost effective construction. In any event, however, the number of tools will be significantly less than that required with present day technology which uses individual tools to form a given profile at any given stack in one cut. Although any given tool may form a very specific complete part of a profile, most tools may be used in connection with other related tooling to generate a final profile.

In one double ended machine, a total of six tools per slide were mounted in two tool units 6 per side. Each of the four tool units 6 consisted of three individual tools 7. The combination of the two stations permitted generation of 53 different basic profiles forming a part of the manufactured product line. The tool profiles were of basic similar profiles in which any given profiles could be formed by a combination of two tools one from each of the first and second stations. Each tool could form a mirror image in the product. By overlapping a tool of the second station or aligning the second tool with the edge of the first tool cut, the extended profile was completed.

In other more complex areas, a greater plurality of tools may be required. For example, another application required generation of 72 profiles. The profile arrangements were rather more complexed. However, based on the present invention, a six station unit with tool stacks developed employing three spaced stacked tools with a total of 35 tools of a basic cutting tip to generate the 72 different profiles.

The tooling employed the preferred construction in which the spindles carried a tool mounting disc with, for each tool, a replaceable with the tool cutter members releasably secured to the outer end of the disc.

Figure 4:
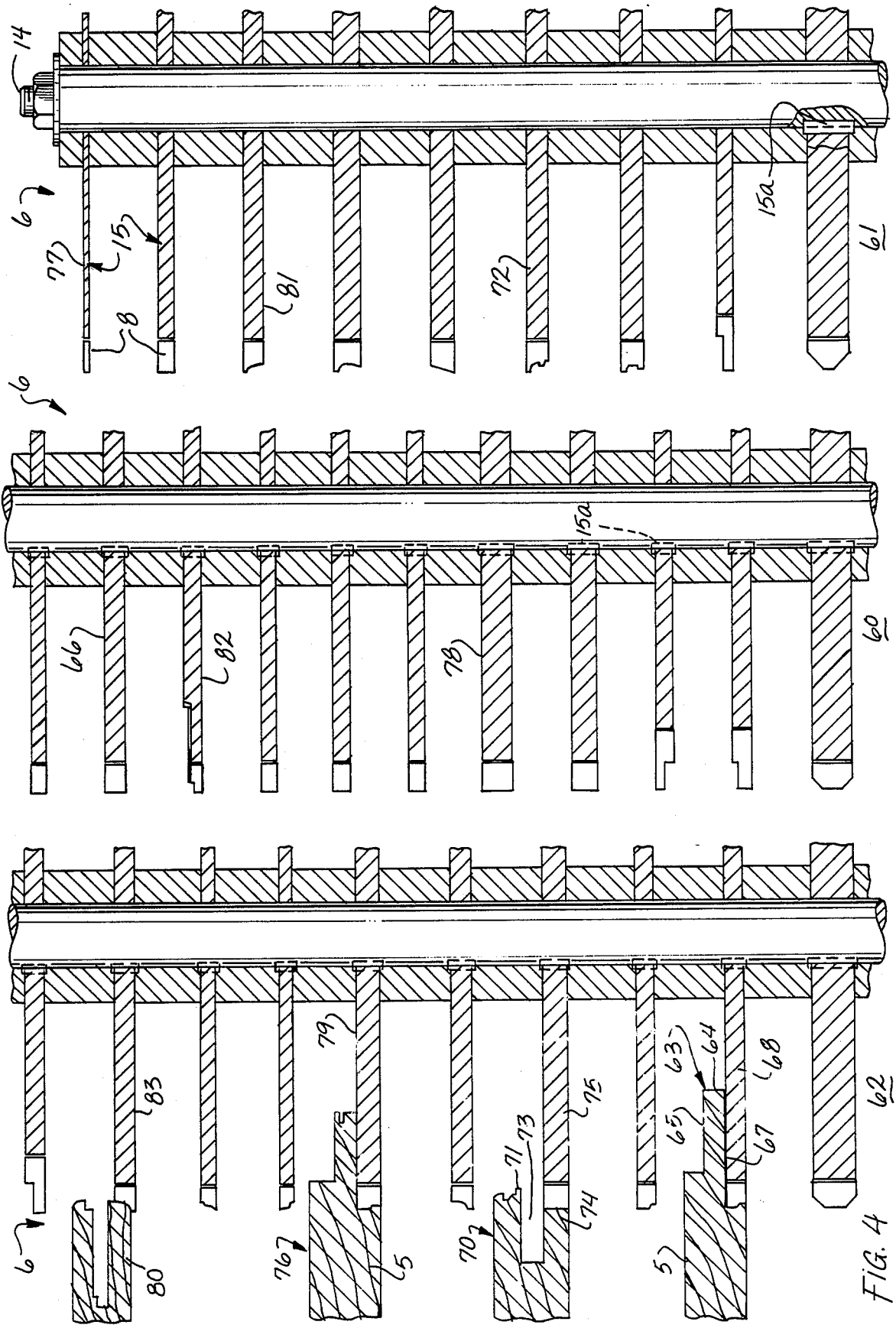
FIG. 4 is a tool diagram illustrating tools in tool units shown in FIGS. 1-3.

A portion of the tooling is diagrammatically illustrated in FIG. 4. An initial tool station for conventional end cutting to trim the edge of the member is not shown, One tool station 60 is shown with 11 different tools each having an essential cutter for cutting a square groove with the exception of the third tool from the top which is shown for making a stepped type cut. The lowermost tool is shown for making a cut having frusta conical configuration. These tools provide a basis for forming various depths of cuts in the edge of the product. The other stations 61 and 62 includes a number of different end tools including tools having cutting edges curved as well as tools with other straight cutting edges and still other tools with more compound cutting edges.

Four wood parts are shown with different edge profiles and in engagement with a tool 7 forming the final cut to form a finished product.

For example, to make a profile 63, the part 5 has the final outermost edge formed by the trim saw at the first or infeed station. The top notch 65 is formed by the tool 66 at the cope station 60. The bottom notch 67 is formed by tool 68 of station 62 with the inner stepped edge formed by tool 68 having the cutting edge with the stepped configurations and in the particular line was a tool used only for the particular profile, while tool 66 is used in a substantial number of different profiles.

The profile 70 was made in a series of four cuts including a first trim cut at a trim station and forming the outermost edge surface 71. The upper edge configuration has a special complex configuration and a special formed tool 72 for the cut is shown in the cope station 61. The tool 7 was also used in one other profile, not shown. A central notch 73 is formed in the profile, and is formed by the same tool 66 used to form the upper notch in the first described part 5. The bottom projection 74 defined by the notch is further trimmed by tool 75 in the third station. Referring particularly to the tool drawing of FIG. 4, the three coping stations are illustrated, each including a tool unit with a stack of tools 7. Each cutting edge 8 of the tools has a cut different from the others in the illustrated embodiment.

A third and fourth parts 5 are also shown.

The third part 76 uses the tool 77 of the first station 61, tool 78 of the second station and tool 79 of the third station. The tool 78 is deeper than the top notch formed in part 76 and is aligned to only use the lower portion of the tool.

The fourth part 80 uses the tools 81, 82 and 83 of the first, second and third stations 61, 60 and 62 respectively. Only a portion of tool 81 is used to form the top curved edge and the curved portion of tool 83 to form a bottom curvature.

By combining of the several tools with precise alignment, overlap and extension, a great variety of profiles are formed without tool changes.

Thus, in forming of the various surfaces, a given tool in each stack or unit is aligned with the path of the product. Each tool is interrelated to each other to form a final profile in the same manner as that discussed with respect to the simpler illustration.

The present invention provides an improved woodworking apparatus which can be applied using the present day technology to establish and maintain a highly cost effective mass production of similar but distinct profiles in a line of profiles.

Various modes of carrying out the invention are contemplated as being within the scope of the following claims particularly pointing out and distinclty claiming the subject matter which is regarded as the invention.

I claim:

1. A multiple station woodworking apparatus for forming edge profiles on a series of parts and including different edge profiles having correspondingly shaped profile portions, comprising a conveyor unit having work support means supporting and moving the parts through a series of tool stations spaced along a work path, each of said tool stations including a tool unit including a stack of cutting tools, a machine frame, each stack of cutting tools including a common support and a plurality of tools secured in a parallel axially spaced relation to said common support, a first slide unit connected to said common support for moving along a first axis, a second slide unit connected to said first slide unit for moving along a second axis at an angle to said first axis, means connecting said second slide unit to said machine frame, first motor means connected to said first slide unit and positioning said common support on said first axis, second motor means connected to said second slide unit and positioning said first slide unit and common support along said second axis, and at least one of said stations located in said work path downstream of an upstream station and having cutting tools with a cutting edge related to and oriented to form predetermined extensions of the surface of said cutting tools of the upstream station whereby the cutting edge of at least some of said tools of said downstream station can be located in overlapping relation to the cut surface established by said cutting tools of said upstream station to form extended surfaces and whereby combinations of said tools forming said plurality of profiles.

2. The apparatus of claim 1 wherein each of said tools is selected to define a finished cut in at least one profile.

3. The woodworking apparatus of claim 1 including first and second position sensing means secured to said first and second slide unit and producing an output position signal corresponding to the position of said tool unit along the first and second axii, a control means including a position demand signal means for establishing a command signal and having means for establishing a related command signal for each tool unit position required for each profile and including a position feedback input means, means connecting each of said tool unit sensing means to said feedback input means with a related demand signal, and said control means energizing said motor means to position each said tool unit on said corresponding axis to establish a match between said command signal and said position signal and thereby position said tool units in successive stations to form selected profiles.

4. The apparatus of claim 3 wherein each of said sensing means includes a movable member moving in the direction of the corresponding axis and a relatively fixed member with respect to the corresponding axis, said position sensing means establishing an absolute position output signal corresponding precisely to the position of said movable member and thereby the position of said tool unit and an individual tool of the tool unit relative to said work path.

5. The woodworking apparatus of claim 1 wherein each said common support of said tool units includes a tool spindle, said tools secured to said tool spindle in axially spaced relation, a spindle drive motor connected to said spindle supporting said tools and rotating the spindle and the tools thereon, said first slide unit connected to said motor for movement on said first axis.

6. The apparatus of claim 5 wherein one of said tools includes a reference surface for vertical orientation of said tool unit relative to said work path and a second reference surface for horizontal orientation of said tool unit relative to said work path.

7. The apparatus of claim 6 including sensing means connected to each of said slide units and establishing an absolute position signal directly related to the absolute position of the tool unit relative to said work path, and a control means including a position demand signal means for establishing a command signal and having means for establishing a related command signal for each tool unit position required for each profile and including a position feedback input means, means connecting each of said tool unit sensing means to said feedback input means with a related position signal, and said control means energizing said motor means to position each said tool unit on said corresponding axis to establish a match between said command signal and said position signal and thereby position said tool unit in successive stations to form selected profiles.

8. The apparatus of claim 7 wherein said control means includes a processor having the tools and the specification of each tool stored in memory, and program means for receiving a profile specification and generally a programmed sequence of said available tools in said stations to cut said profile.

9. A multiple station woodworking apparatus, comprising a conveyor unit having work support means for supporting parts and moving parts through a trim station and a plurality of cope tool stations spaced along a work path, each of said cope tool stations including a tool unit including a vertical stack of cutting tools, each stack of cutting tools including a common support shaft and a plurality of tools secured in parallel axially spaced relation to said common support, each of said tool units including a fixed support member, a first movable member coupled to said support member and moving along a first axis, a second movable member movably attached to said first movable member and movable along a second axis at an angle to said first axis, first motor means connected to said fixed support member and said first movable member and positioning said first movable member on said fixed support member, second motor means connected to said first movable member and to said second movable member and positioning said second movable member along said second axis, said cope stations including a first cope station and at least one second cope stations downstream of said first cope station, said tools of each of said cope stations having cutting tools with a cutting edge related to and oriented to form predetermined extensions of the cuts of tools from others of said cope tools station whereby the cutting edge of at least some of said tools of said second cope stations are operably located in overlapping relations to the cut surface established by tools of said first cope station to form extended surfaces and whereby combinations of said tools form a plurality of different profiles.

10. The apparatus of claim 9 wherein each of said tools is selected to define a finished cut in at least one profile.

11. The apparatus of claim 9 wherein a plurality of said tools include standard cutting tips having flat cutting edges.

12. A woodworking apparatus adapted to produce a line of edge worked wood products having edge profiles including a line of different profiles with interrelated recessed and projecting surfaces, comprising a frame structure, means for successive transport of product along a fixed work path, a first work station and a second work station adjacent said work path, each of said work stations including a tool unit comprising a plurality of rotating cutting tools secured to a drive spindle, a tool unit support structure mounted to said frame structure for positioning said tool unit in said work path, said support structure having a first slide unit having an axis parallel to the axis of the spindle for aligning of an individual tool in said work path and a second slide unit having a lateral axis of movement for positioning of a tool unit relative to the edge of the work path, first motor means secured to said support structure and said first slide unit for moving said too unit along said first axis, second motor means connected to said support structure and coupled to said second slide unit for positioning said spindle along said second axis of movement, first and second position sensing means secured to said support structure for sensing the corresponding position along the first and second axii, each of said sensing means including a movable member moving in the direction of first axis and a relatively fixed member with respect to the axis, said position sensing means establishing an absolute position output signal corresponding precisely to the position of said movable member and thereby the position of said tool unit and an individual tool of the tool unit relative to said work path, said tools of said second stack of said second work station having cutting tools with a cutting edge related to and oriented to form predetermined extensions of the surface of said first cutting tools of said first work station whereby the cutting edge of at least some of said tools of said second station can be located in overlapping relation to the cut surface established by said first cutting tools to form extended surfaces and whereby combinations of said tools forming said plurality of profiles, and a control means including a position demand signal means and a position feedback input means, means receiving a command signal connecting each of said tool unit position sensing means to said input means and establishing a position signal, and said control means energizing said motor means to position said tool unit on said corresponding axii to establish a match between said command signals and said position signals and thereby position said tools in successive stations to form selected profiles.

13. The apparatus of claim 12 wherein said control means includes a programmed controller including a processor for storing a plurality of profile programs defining the position of the tools in said tool stations to cut said plurality of profiles.

14. The apparatus of claim 13 wherein said processor including input means for defining a profile, said processor having means to determine available tools to form said profile and establish a profile program from said available tools.

15. In a process of forming a series of edge profiles in individual wood products by passing of said wood products with controlled movement past a first tool station and a second tool station, each of said tool stations including a tool unit, each tool unit comprising a rotation spindle and a plurality of individual tool units secured to said spindle in axially spaced relation, said individual tools being interrelated to each other whereby tools at the successive work station form different portions of said different profiles, comprising positioning of said first tool unit with one of said tools in said workpath for forming a first profile surface of a profile, positioning a second tool of said second tool unit in said workpath and precisely oriented with respect to said first tool unit to form a continuation of said profile surface, passing a series of said parts through said stations to form a series of said parts, thereafter successively positioning said first and second tool units to define a second profile and passing a series of said parts through said station to form a second series of said parts.

16. The process of claim 15 including overlapping the cutting edge of said second tool with the previous cut of said tool at said first station to form a continuation of said first cut.

17. The process of claim 3 wherein said tool of one of said tool units is offset to align only a portion of the tool with the work path and thereby form a partial cut on the part.

* * * * *

UNITED STATES PATENT AND TRADEMARK OFFICE
CERTIFICATE OF CORRECTION

PATENT NO. : 4,878,524

DATED : November 7, 1989

INVENTOR(S) : Bruce C. Rosenthal et al

It is certified that error appears in the above-identified patent and that said Letters Patent is hereby corrected as shown below:

Col. 12, line 7, delete "includes" and substitute therefor ---including---; Col. 13, line 41, delete "too" and substitute therefor ---tool---; Col. 14, line 9, after "means" and before "and" insert ---receiving a command signal---; Col. 14, line 10, before "connecting" delete "receiving a command signal", Col. 14, line 11, after "unit" delete "position"; Col. 14, line 35, delete "rotation" and substitute therefor ---rotating---.

Signed and Sealed this

Sixteenth Day of July, 1991

Attest:

HARRY F. MANBECK, JR.

*Attesting Officer*   *Commissioner of Patents and Trademarks*